United States Patent
Brada et al.

(10) Patent No.: US 12,026,133 B2
(45) Date of Patent: Jul. 2, 2024

(54) DATA SPACE SCALABILITY FOR ALGORITHM TRAVERSAL

(71) Applicant: Workday, Inc., Pleasanton, CA (US)

(72) Inventors: Viktor Brada, Tinec (CZ); Peter Fedorocko, Prague (CZ); Filip Dousek, Prague (CZ); Hynek Walner, Hlincová Hora (CZ)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 17/357,695

(22) Filed: Jun. 24, 2021

(65) Prior Publication Data

US 2021/0319001 A1    Oct. 14, 2021

Related U.S. Application Data

(63) Continuation of application No. 16/580,895, filed on Sep. 24, 2019, now Pat. No. 11,074,234.

(51) Int. Cl.
*G06F 16/215* (2019.01)
*G06F 16/23* (2019.01)

(52) U.S. Cl.
CPC ........ *G06F 16/215* (2019.01); *G06F 16/2379* (2019.01)

(58) Field of Classification Search
CPC .................... G06F 16/215; G06F 16/2379
USPC ........................................................ 707/692
See application file for complete search history.

(56) References Cited

U.S. PATENT DOCUMENTS

| | | | |
|---|---|---|---|
| 6,061,684 A | 5/2000 | Glasser | |
| 7,301,448 B1 | 11/2007 | Usery | |
| 7,904,297 B2 * | 3/2011 | Mirkovic | G10L 15/26 704/235 |
| 7,984,073 B1 * | 7/2011 | Basiago | G06F 16/22 707/802 |
| 8,706,725 B2 * | 4/2014 | Bailey | G06F 16/334 707/769 |
| 8,825,641 B2 * | 9/2014 | Radlinski | G06F 16/338 707/750 |
| 9,406,092 B2 * | 8/2016 | Adams | G06Q 30/0631 |
| 10,089,426 B2 | 10/2018 | Isshiki | |
| 10,152,479 B1 * | 12/2018 | Granström | G06F 16/483 |
| 10,853,359 B1 * | 12/2020 | Waugh | G06F 16/24568 |
| 10,963,296 B1 * | 3/2021 | Bannert | G06F 9/5083 |
| 11,037,158 B2 * | 6/2021 | Lai | G06Q 20/407 |
| 11,055,331 B1 * | 7/2021 | Neumann | G06F 16/3332 |
| 11,373,257 B1 * | 6/2022 | Guo | G06F 16/288 |
| 2002/0123993 A1 | 9/2002 | Chau | |
| 2005/0060285 A1 * | 3/2005 | Barsness | G06F 16/24542 |
| 2007/0103984 A1 | 5/2007 | Kavuri | |
| 2007/0106512 A1 * | 5/2007 | Acero | G10L 15/197 704/260 |
| 2009/0248669 A1 * | 10/2009 | Shetti | G06F 16/3322 707/999.005 |

(Continued)

*Primary Examiner* — Cam Linh T Nguyen
(74) *Attorney, Agent, or Firm* — Van Pelt, Yi & James LLP

(57) ABSTRACT

A system for data space limitation includes and interface and a processor. The interface is configured to receive a query for a structured data set. The processor is configured to determine an ordered list for calculations to respond to the query; perform the calculations according to the ordered list until an allowed time required for interactivity is reached; and in response to the allowed time being reached, provide results of the calculations.

22 Claims, 16 Drawing Sheets

| Country | Organization | Headcount |
|---|---|---|
| USA | Product | 900 |
| USA | Sales | 100 |
| Canada | Product | 300 |
| Canada | Sales | 50 |

(56) References Cited

U.S. PATENT DOCUMENTS

| | | | |
|---|---|---|---|
| 2010/0198777 A1* | 8/2010 | Lo | G06F 16/283 |
| | | | 707/E17.014 |
| 2012/0109907 A1 | 5/2012 | Mandagere | |
| 2012/0150895 A1* | 6/2012 | Barsness | G06F 16/245 |
| | | | 707/769 |
| 2012/0317084 A1 | 12/2012 | Liu | |
| 2015/0142420 A1* | 5/2015 | Sarikaya | G10L 15/1815 |
| | | | 704/9 |
| 2016/0267610 A1 | 9/2016 | Corbett | |
| 2016/0328661 A1* | 11/2016 | Reese | G06N 3/044 |
| 2016/0379125 A1* | 12/2016 | Bordawekar | G06F 9/5027 |
| | | | 706/12 |
| 2017/0017716 A1* | 1/2017 | Joshi | G06F 16/93 |
| 2018/0232488 A1 | 8/2018 | Jafer | |
| 2019/0026697 A1* | 1/2019 | Burton | G06F 8/71 |
| 2019/0050451 A1* | 2/2019 | Davidoff | G06F 16/2425 |
| 2019/0079946 A1* | 3/2019 | Li | H04L 67/289 |
| 2021/0008448 A1* | 1/2021 | Kolen | G07F 17/3272 |

\* cited by examiner

| Date | Product | Category | Customer | Price | Amount |
|---|---|---|---|---|---|
| 2 Feb 2019 | Product A | Category A | Customer A | 100 | 4 |
| 4 Feb 2019 | Product B | Category A | Customer B | 10 | 5 |
| 6 Feb 2019 | Product C | Category B | Customer C | 1000 | 3 |
| 8 Feb 2019 | Product D | Category C | Customer A | 10000 | 2 |
| 1 Jan 2019 | Product A | Category A | Customer B | 110 | 3 |
| 3 Jan 2019 | Product B | Category A | Customer D | 9 | 4 |
| 5 Jan 2019 | Product C | Category B | Customer D | 990 | 2 |
| 7 Jan 2019 | Product D | Category C | Customer A | 10010 | 1 |

FIG. 2

| Area (Node) | Value (Count) |
|---|---|
| Product A [Product] | 2 |
| Product A [Product] + Customer A [Customer] | 1 |

FIG. 3

| # | Combination of Attributes |
|---|---|
| 1 | Product |
| 2 | Category |
| 3 | Customer |
| 4 | Product + Category |
| 5 | Product + Customer |
| 6 | Category + Customer |
| 7 | Product + Category + Customer |

FIG. 4

| # | Combination of Attributes | Area (node) – Combination of Features (elements) |
|---|---|---|
| 1 | Product | Product A |
| 2 | Product | Product B |
| 3 | Product | Product C |
| 4 | Product | Product D |

FIG. 5

| # | Combination of Attributes | Area (node) – Combination of Features (elements) |
|---|---|---|
| 1 | Product + Customer | Product A + Customer A |
| 2 | Product + Customer | Product B + Customer B |
| 3 | Product + Customer | Product C + Customer C |
| 4 | Product + Customer | Product D + Customer A |
| 5 | Product + Customer | Product A + Customer B |
| 6 | Product + Customer | Product B + Customer D |
| 7 | Product + Customer | Product C + Customer D |

FIG. 6

| Country | City | Site |
|---|---|---|
| USA | New York | A |
| USA | Washington DC | B |
| Canada | Toronto | C |
| Canada | Montreal | D |
| Czech Republic | Prague | E |

FIG. 7

| Department | Size | Site |
|---|---|---|
| Sales | small | A |
| Product | big | B |
| Product | small | C |

FIG. 8

| Country | Organization | Headcount |
|---------|--------------|-----------|
| USA | Product | 900 |
| USA | Sales | 100 |
| Canada | Product | 300 |
| Canada | Sales | 50 |

FIG. 14

DATA SPACE SCALABILITY FOR ALGORITHM TRAVERSAL

CROSS REFERENCE TO OTHER APPLICATIONS

This application is a continuation of U.S. patent application Ser. No. 16/580,895, now U.S. Pat. No. 11,074,234, entitled DATA SPACE SCALABILITY FOR ALGORITHM TRAVERSAL filed Sep. 24, 2019 which is incorporated herein by reference for all purposes.

BACKGROUND OF THE INVENTION

Datasets for an organization can be extremely large and contain a wide variety of information. Such a dataset can include human resource, corporate, financial, legal, vendor, customer, medical, and other records corresponding to past, current and future activities of the organization. Increasingly, identifying, processing, and analyzing such datasets is important to the health and growth of an organization. However, the dataset is typically very large and a data space made from combinations of dataset entries even larger. Processing times for the data space analysis can be prohibitive especially for a system needing real-time interactive behavior.

BRIEF DESCRIPTION OF THE DRAWINGS

Various embodiments of the invention are disclosed in the following detailed description and the accompanying drawings.

FIG. 2 is a diagram illustrating an embodiment of structured data.

FIG. 3 is a diagram illustrating an embodiment of structured data.

FIG. 4 is a diagram illustrating an embodiment of a combination of attributes.

FIG. 5 is a diagram illustrating an embodiment of a combination of features.

FIG. 6 is a diagram illustrating an embodiment of a combination of features.

FIG. 7 is a diagram illustrating an embodiment of a data set with hierarchical dimensions.

FIG. 8 is a diagram illustrating an embodiment of a data set with non-hierarchical data.

FIG. 14 is a diagram illustrating an embodiment of a data set.

DETAILED DESCRIPTION

Figure 1:
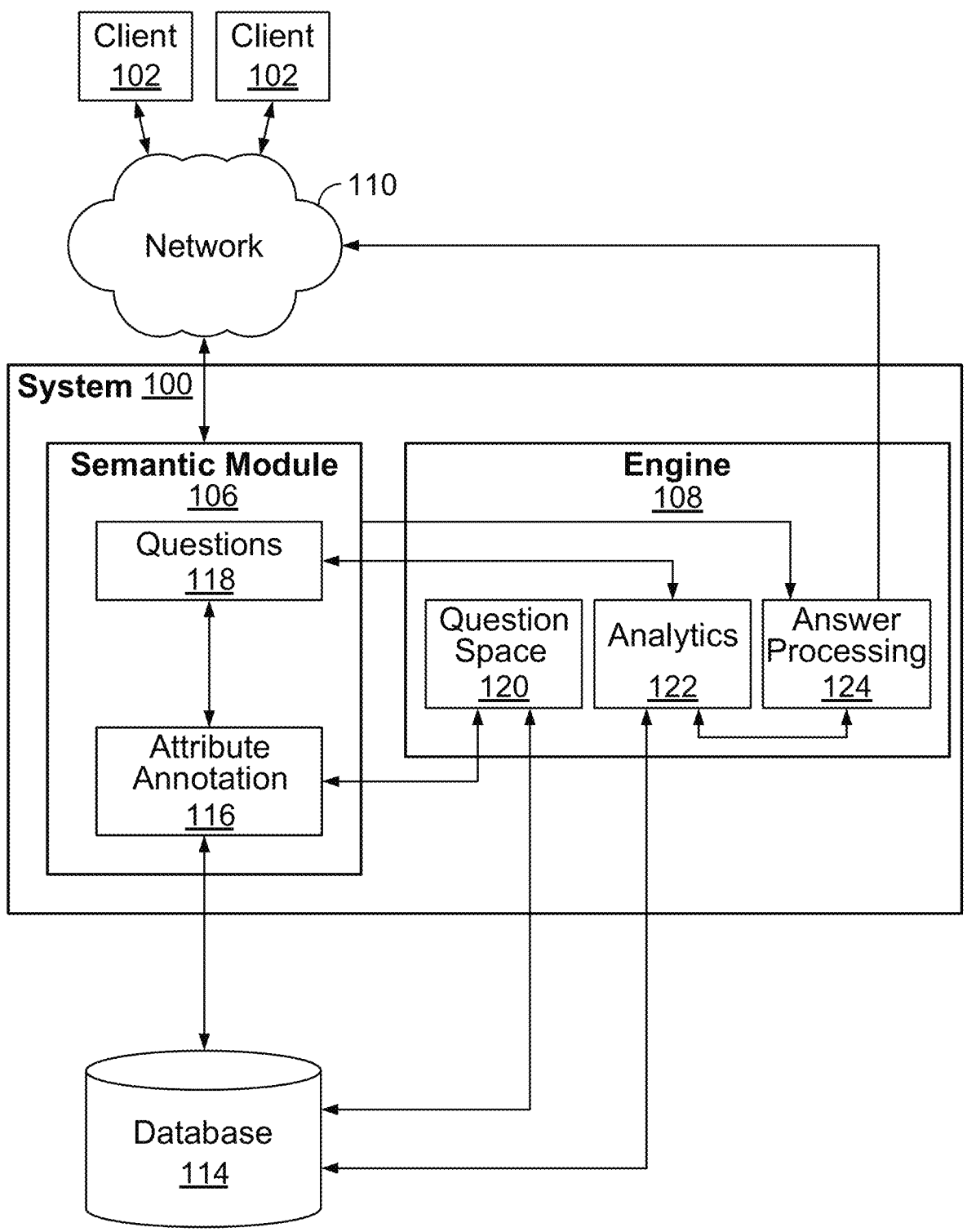
FIG. 1 is a block diagram illustrating an embodiment of a system architecture for data space scalability for algorithm traversal.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for data space scalability for algorithm traversal is disclosed. The system includes an interface and a processor for data space limitation. The interface is configured to receive a structured data set. The processor is configured to: determine a whole data space for the structured data set; remove duplicate pairs from the whole data space to generate a duplicate pair limited data space; remove hierarchical redundant pairs from the duplicate pair limited data space to generate a redundant pair limited data space; remove user settable combinations from the redundant pair limited data space to generate a user settable combinations limited data space; remove privacy preserving combinations from the user settable combination limited data space to generate a privacy preserving combinations limited data space; remove access prohibited combinations from the privacy preserving combinations limited data space to generate an access prohibited combination limited data space; and provide the access prohibited combination limited data space for combination calculation.

In responding to inquiries regarding a large data set and the combinations of data from the large data set, the system limits the data space over which an inquiry is made. The limitation removes duplicate calculations, hierarchically redundant calculations, user settable calculations, privacy prohibited calculations, and access prohibited calculations in order to speed system calculations. In addition, an ordering to the calculations can enable calculating down the ordered list until an allowed time required for interactivity is reached. The structure and properties of the data enable limitation of the data space for calculation. Symmetry of the data can lead to duplicates because a first combinations might include a situation where a first operation is performed using A and then using B and a second combination might include a situation where a second operation is performed using B and then using A. With symmetric data, the first operation and second operation produce duplicate results and so one operation can be selected for removal from the data space. Selection criteria can include determining which operation is more efficient for processing or memory resources or processing speed. Similarly, the hierarchy of the data can also lead to redundant calculations. Again one of the operations can be selected for removal and there can be criteria for which combination to remove from the data space. In addition, user settable criteria, privacy criteria, and access prohibition criteria can be used to remove combinations from a data space for calculation.

The system prioritizes the order and/or limits the number of automated analyses that are to be executed on structured data given a set of provided constraints. This makes the computer more efficient by making processing a over the dataset faster by limiting the data space applicable for calculation.

FIG. 1 is a block diagram illustrating an embodiment of a system architecture for data space scalability for algorithm traversal. In the example shown, clients 102 are connected to system 100 comprising semantics module 106 and engine 108 via networks 110. A client can be a laptop computer, a desktop computer, a tablet, a mobile device, a smart phone, a wearable networking device, or any other appropriate computing device. Users of clients 102 access system 100 for annotating dataset(s) 114. Users of clients 102 utilize system 100 for answering questions using the dataset(s) 114. Although different, clients 102 are shown as accessing system 100 for annotating and using dataset(s) 114, the same client and/or user may perform both functions. Networks 110 can be the Internet, a private network, a hybrid network, or any other communications network. Although depicted separately, networks 110 may be part of a single network.

System 100 includes semantics module 106, engine 108 and storage including one or more dataset(s) 114. Semantics module 106 and engine 108 may be implemented using a processor. Dataset(s) 114 includes data related to a business and may be in an online analytical processing (OLAP) cube or other format. For example, dataset(s) 114 may include sales, purchasing, other financial data, human resources, legal, organizational and/or other data which users of clients 102 desire to use in answering questions related to the business in which owner of system 100 is engaged. Although referred to hereinafter in singular form, dataset(s) 114 may contain multiple datasets.

Semantics module 106 is used to translate between the particular questions desired to be answered by users of clients 102 and queries, such as SQL queries, used to interrogate dataset 114. Stated differently, semantics module 106 may be seen as a level of abstraction between code used in connection with dataset 114 and the understanding of users of clients 102. To perform this abstraction function, semantics module 106 annotates dataset 114 with attributes and provides templates usable in business questions. Consequently, semantics module 106 may be viewed as including one or more libraries of attributes, patterns, routines, templates and other information utilized in translating between questions and dataset queries. These libraries may be included in attribute annotation 116 and questions 118. Attribute annotation 116 include attributes (described below) in particular categories with which dataset 114 has been annotated. Such categories are related to the business in which users of clients 102 are engaged or interested in.

Questions 118 includes question templates (hereinafter templates) for the natural language questions, the patterns indicating the relationship between metrics for the question, corresponding database queries and methods/routines usable by engine 108 in answering the questions. Questions 118 includes preset templates and configurable templates. Configurable templates are used in questions that are at least partially configurable by users of clients 102. Configurable templates include particular patterns or attributes, to provide questions that the users of clients 102 have customized. For example, one such configurable template may be: "How does {{measure1}} compare with the plan for {{time1}} for {{measure2}}?" The user of clients 102 may select a measure such as "sales", "diversity", "hiring" or "revenue" for measure1; a time interval such as "current quarter", "previous quarter", "current year" for time1; and a location, department or the entire company for measure2. The resulting questions might be "How does hiring compare with the plan for last quarter for the legal department?" Preset templates correspond to preset questions that may be selectable from a menu and include attributes, patterns and other features that have been set. Thus, preset question is selectable, but not configurable by users of clients 102. Questions 118 may provide templates for both general questions and questions that are specific to an industry, department or other category.

Engine 108 may be used to process questions. Engine 108 includes question space 120, analytics 122, and answer processing 124. Question space 120 uses attributes and other information to narrow the space in dataset 114 investigated by the operations provided by semantics module 106. Questions space 120 also, in conjunction with dataset 114 determines a limited data space. For example, based on the structured data set, question space 120 determines a whole data space for the structured data set; removes duplicate pairs from the whole data space to generate a duplicate pair limited data space; removes hierarchical redundant pairs from the duplicate pair limited data space to generate a redundant pair limited data space; removes user settable combinations from the redundant pair limited data space to generate a user settable combinations limited data space; removes privacy preserving combinations from the user settable combination limited data space to generate a privacy preserving combinations limited data space; removes access prohibited combinations from the privacy preserving combinations limited data space to generate an access prohibited combination limited data space; and provides the access prohibited combination limited data space for combination calculation. In various embodiments, the ordering of the steps outlined is different and a person familiar with the art would easily be able to envision implementing a system that is able to limit the data space for calculation that uses a different ordering of steps mentioned above.

Analytics 122 provides queries, such as SQL queries, to dataset 114. Analytics 122 also receives information from dataset 114 in response to the queries and performs any additional processing to provide a number of possible answers to the question including templates. Answer processing 124 may filter, rank or further reduce and order the responses to the question. In so doing, answer processing 124 may also utilize attributes provided by semantics module 106. Answer processing 124 returns the final answer(s) to clients 102.

FIG. 2 is a diagram illustrating an embodiment of structured data. In the example shown, structured data is represented by data in a table with columns and rows where each row includes data related to a transaction and columns include attributes (dimensions) and values (measures) of the transactions. In the example shown, the table includes columns labeled date, product, category, customer, price, and amount. The columns product, category, and customer are attributes (dimensions) of the transaction. The columns price and value are values (measures) of the transaction. The rows correspond to a transaction occurring on a date. For example, transactions shown in the table include: date 2 Feb. 2019, product A, category A, customer A, price 100, and amount 4; date 4 Feb. 2019, product B, category A, customer B, price 10, and amount 5; date 6 Feb. 2019, product C, category B, customer C, price 1000, and amount 3; date 8 Feb. 2019, product D, category C, customer A, price 10000, and amount 2; date 1 Jan. 2019, product A, category A, customer B, price 110, and amount 3; date 3 Jan. 2019, product B, category A, customer D, price 9, and amount 4; date 5 Jan. 2019, product C, category B, customer D, price 990, and amount 2; and date 7 Jan. 2019, product D, category C, customer A, price 10010, and amount 1.

FIG. 3 is a diagram illustrating an embodiment of structured data. In the example shown, the table shows column for areas and values of counts of occurrence. The rows show product A with 2 occurrences and combination of product A and customer A with 1 occurrence. The system performs an automated analysis that for any given structured data automatically identifies areas (also called nodes) where a particular observable situation occurs that is defined or queried by a user. In the example shown, the count of observable situations is shown for Product A and Product A and customer A. Area (node) is a subset of the structured data that shares the same features and that can be aggregated into a single record, where a feature (element) is a particular value of the attribute (dimension). For example, a feature in the "Product" attribute (dimension) is "Product A". And as another example, the feature "Customer" attribute (dimension) is "Customer C".

An area is any subset of the structured data that has one or multiple mutual features (elements). An example of an area is all records in the structured data that have the "Product A" feature (element) in the "Product" attribute. Another example of an area is all records in the structured data that have the "Product A" feature (element) in the "Product" attribute and simultaneously the "Customer A" feature (element) in the "Customer" attribute.

Another significant characteristic of an area (node) is that all of its items can be aggregated into a single record. For example, given the aggregation function "count", an area can be defined by the "Product A" feature that is aggregated into a single record with value 2.

An observable situation is the object of the automated analysis. An observable situation is defined by a user and is composed of a behavior and a condition. An automated analysis validates an observable situation as defined by the user on the aggregated values of the particular area.

The behavior defines what is desired to be observed in the analyzed area. Examples of behavior are:
  a change in a trend over time;
  a change of values compared to another period
  a difference from a defined threshold
  a difference from a calculated benchmark
  a difference from planned or forecasted data
  anomalous values
  a change in a seasonal component
  a new extreme (maximum or minimum)
  a data quality issue
  a degree of similarity to another situation
  a statistically significant observation related to any of the above The condition defines what situation ought to be met to proclaim that the observable situation is to be identified within a specific particular area.

In order to automatically identify all areas where a particular observed situation is occurring, the system's automated analysis needs to validate an observed situation against every possible area (node) that exists in the structured data. The set of all possible areas (nodes) that exists in given structured data is called the data space. The system's automated analysis works in three phases:
  1. space generation
  2. space analysis (validation of observable situations)
  3. selecting the portion of the analysis most relevant to a given user The system's automated analysis generates the data space in two phases:
  1. Generation of all possible combinations of attributes (dimensions) that defines the area
  2. Generation of all possible features (elements) combinations for each generated combination of attributes FIG. 4 is a diagram illustrating an embodiment of a combination of attributes.

In the example shown, seven combinations are displayed. Combination 1 is Product. Combination 2 is Category. Combination 3 is Customer. Combination 4 is Product+Category. Combination 5 is Product+Customer. Combination 6 is Category+Customer. Combination 7 is Product+Category+Customer. A given area (node) can be defined as a combination of elements (features), the system's automated analysis generates 1 to N combinations from all available attributes. In the case where there are three attributes in the example of structured data, the system's automated analysis process generates the combinations of attributes shown in FIG. 4.

FIG. 5 is a diagram illustrating an embodiment of a combination of features. In the example shown, to obtain the whole data space, a system's automated analysis generates every possible area, which is a subset of the structured data that shares the same features for each combination of attributes. Given a combination of attributes for "Product", the system's automated analysis generates four areas as the "Product" attribute contains four different features (elements) in the structured data example. Row 1 shows combination of attribute Product with Area—combination of features Product A. Row 2 shows combination of attribute Product with Area—combination of features Product B. Row 3 shows combination of attribute Product with Area—combination of features Product C. Row 4 shows combination of attribute Product with Area—combination of features Product D.

FIG. 6 is a diagram illustrating an embodiment of a combination of features. In the example shown, to obtain the whole data space, a system's automated analysis generates every possible area, which is a subset of the structured data that shares the same features for each combination of attributes. Given combination of attributes "Product+Customer", the automated analysis process (program) generates another 7 areas (nodes). Row 1 shows combination of attributes Product+Customer with Area—combination of features Product A+Customer A. Row 2 shows combination of attributes Product+Customer with Area—combination of features Product B+Customer B. Row 3 shows combination of attributes Product+Customer with Area—combination of features Product C+Customer C. Row 4 shows combination of attributes Product+Customer with Area—combination of features Product D+Customer A. Row 5 shows combination of attributes Product+Customer with Area—combination of features Product A+Customer B. Row 6 shows combination of attributes Product+Customer with Area—combination of features Product B+Customer D. Row 7 shows combination of attributes Product+Customer with Area—combination of features Product C+Customer D. The automated analysis system repeats this generation for each combination of attributes (dimensions) to obtain whole data space Once automated analysis system generates the whole business space, it proceeds to its analysis by sequentially validating observable situations for each node (area) of the data space. A set of constraints and inefficiencies is introduced in the combinatorial analysis of the data space that prohibits the analysis of bigger structured data, decrease the value of the selected observable situations or endanger security and privacy. All of these need to be taken into account for the automated analysis system to execute.

Some pairs of combinations of attributes (dimensions) will give identical results under specific circumstances. This could lead to duplicate results which erode user trust in the automated analysis. If this problem is resolved, it will also optimize computation because only one combination from a duplicate pair will be analyzed without any loss in the quality of the results. Duplicate combinations are dependent on:

whether the analyzed value is symmetric
whether there is a hierarchical relation among attributes (dimensions)

A value is symmetric if it doesn't matter which attribute is used to perform the aggregation. Given the following definition how values ought to be aggregated during the node (area) aggregation:

1. sum(revenue) is a symmetric measure because it doesn't reference any attribute (dimension)
2. avg(revenue) is a symmetric measure because it doesn't reference any attribute (dimension)
3. sum(revenue)/parent(sum(revenue)) is a definition of market share value calculated for a given area (node). It is asymmetrical value because it does reference parent attribute. Example: when analyzing structured business data with Product and Country attributes, the algorithm will analyze the market share of Products in specific Countries and also Countries for specific Products. These two areas (nodes) of data will have different values.

Dimensions A and B are hierarchical if every element in dimension A has exclusive 1:N relationship with elements from dimension B. For example, one element from A corresponds to one or more elements from B and those elements cannot correspond to any other element from A.

FIG. 7 is a diagram illustrating an embodiment of a data set with hierarchical dimensions. In the example shown, the three columns of the data set are country, city, and site. Row 1 includes entries country: 'USA', city: 'New York', and site: 'A'. Row 2 includes entries country: 'USA', city: 'Washington D.C.', and site: 'B'. Row 3 includes entries country: 'USA', city: 'New York', and site: 'A'. Row 4 includes entries country: 'Canada', city: 'Toronto', and site: 'C'. Row 4 includes entries country: 'Canada', city: 'Montreal', and site: 'D'. Row 5 includes entries country: 'USA', city: 'New York', and site: 'E'. Note the hierarchy displayed in that both 'New York' with site 'A' and 'Washington D.C.' with site 'B' are in 'USA' and both 'Toronto' with site 'C' and 'Montreal' with site 'D' are in 'Canada'.

FIG. 8 is a diagram illustrating an embodiment of a data set with non-hierarchical data. In the example shown, the three columns of the data set are department, size, and site. Row 1 includes entries department: 'Sales', size: 'small', and site: 'A'. Row 2 includes entries department: 'Product', size: 'big', and site: 'B'. Row 3 includes entries department: 'Product', size: 'small', and site: 'C'. Note the non-hierarchy displayed in that no single department includes more than one size and corresponding site.

Every analyzed area (node) is represented as bits in a disk space or memory of a computer executing the automated analysis system. In various embodiments, the bits are stored in a random access memory (RAM) for fast access, in hard drive disk space for lower cost, or any other appropriate memory. In some embodiments, the bits are stored in multiple memories and/or is some cases using a caching strategy to be able to take advantage of speed and low cost memories.

In some cases, the combinatorial nature of the data space causes the structured data to generate a large number of areas (nodes) whose representation is not able to fit into the available memory (RAM or disk).

Similar to a disk space or memory constraint, every area (node) in the data space takes some amount of time to be analyzed (validation of observable situation). The sequential nature of an automated analysis can be partially addressed by parallelization. Nevertheless, despite the available parallelization possibilities, the number of areas (nodes) to be analyzed from the real structured data presents a constraint on the time it takes for the processing to finish. Thus, for the process (program) to finish in an appropriate amount of time (milliseconds, seconds, minutes, hours), so that a user can interact with the results, the processing has to be limited.

Some users might have access just to part of the structured data (e.g. only to the country="US"). The program cannot present them with the results of the analysis concerning any other area (node) of data than the one they have access to. There can be many of these restrictions for many users, they might be similar (every user has access to different Country) or different (filtering by different dimensions, conditioned access on other dimension—for example, can see everything but ethnicity just for country="US") and overlapping or not. So, the option to run the analysis for every user might not be practical as it would require running the analysis potentially thousands of times instead of just once.

In some specific cases, the system cannot allow the records (transactions) in the input dataset to be identifiable using the results of the analysis. For example, in an HR analytic application, specific employees must not be identifiable. This limits what areas (nodes) of the data space can be analyzed and presented to a given user.

Even though some results might be correct, representing a real phenomenon and pinpointing the issue to the correct part of the dataset, the results might still hold low value to users. This might be a case where the analysis result and the issue identified are not helpful as a way to look at the dataset (Relevance of some dimensions and combinations) or just some specific events (Relevance of specific events).

Some areas of the structured data might be unhelpful or meaningless in the context of any given user especially for some attributes and their combinations. Typically, this is because the user has no way to act on the information gained by the automated analysis results when these results identify a particular area (node). For example, the system analysis might identify an issue that is observable in the USD Currency area (node). However, this issue may not be actionable as there may be no obvious way to control currency fluctuations.

Even though some results might be correct, representing real phenomenon and pinpointing the issue to the correct part of the dataset, the results might still hold low value to users. For example, the sales of a retailer have decreased because of the closure of a big store, if this result is displayed it would be technically correct, but events like this are expected and well-known in the company.

The following outlines solutions to the constraints described above. Not all of the described solutions need to be implemented in the automated analysis system that executes using the real structured data.

Every input structured data for the automated analysis system can be objectively described by set of properties that specify which columns are values (measures), attributes (dimensions), and what is the format of the date aggregation. For a given data set, this set of properties does not change over time. In some cases, the provided information in the set of properties allows automated analysis system to detect duplicated or useless areas (nodes) in the generated data space.

The specific information that is needed includes whether the relationship between measures in a portion of the data set are symmetric and also includes whether the relationship between measures in a portion of the data set are hierarchical. In the event that values of a pair of data set entries are symmetric, the symmetry may allow removal of one of the pairs. In the event that values of the data set are in a hierarchy, the hierarchy may allow the removal of some combinations of data set entry within the hierarchy.

Figure 9:
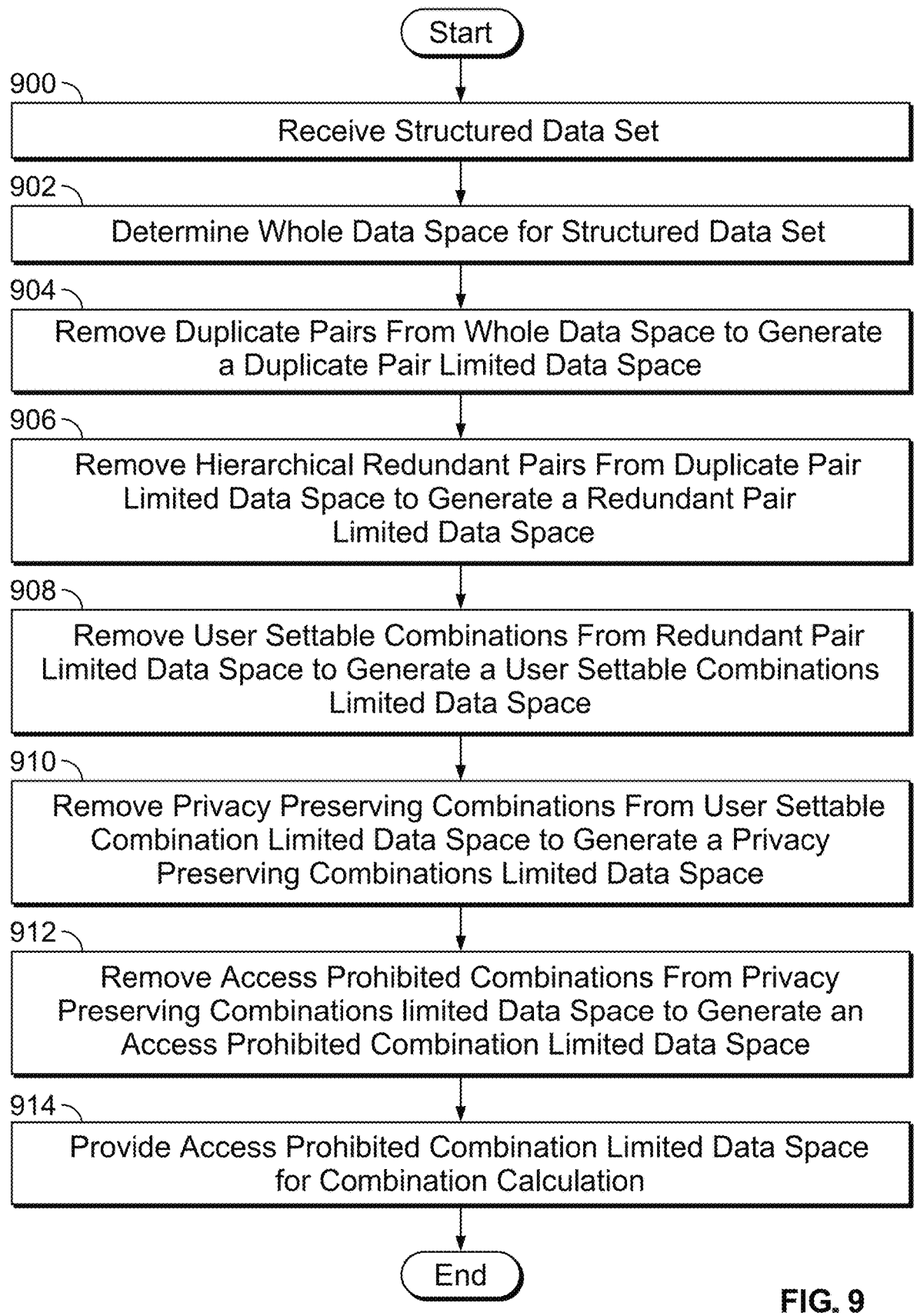
FIG. 9 is a flow diagram illustrating an embodiment of a process for data space scalability for algorithm traversal.

FIG. 9 is a flow diagram illustrating an embodiment of a process for data space scalability for algorithm traversal. In some embodiments, the process of FIG. 9 is executed using system 100 of FIG. 1. In the example shown, in 900 a structured data set is received. In 902, a whole data space is determined for the structured data set. In 904, duplicate pairs are removed from the whole data space to generate a duplicate pair limited data space. In 906, hierarchical redundant pairs are removed from the duplicate pair limited data space to generate a redundant pair limited data space. In 908, user settable combinations are removed from the redundant pair limited data space to generate a user settable combinations limited data space. In 910, privacy preserving combinations are removed from the user settable combinations limited data space to generate a privacy preserving combinations limited data space. In 912, access prohibited combination are removed from the privacy preserving combinations limited data space to generate an access prohibited combination limited data space. In 914, the access prohibited combination limited data space is provided for a combination calculation, and the process ends.

Figure 10:
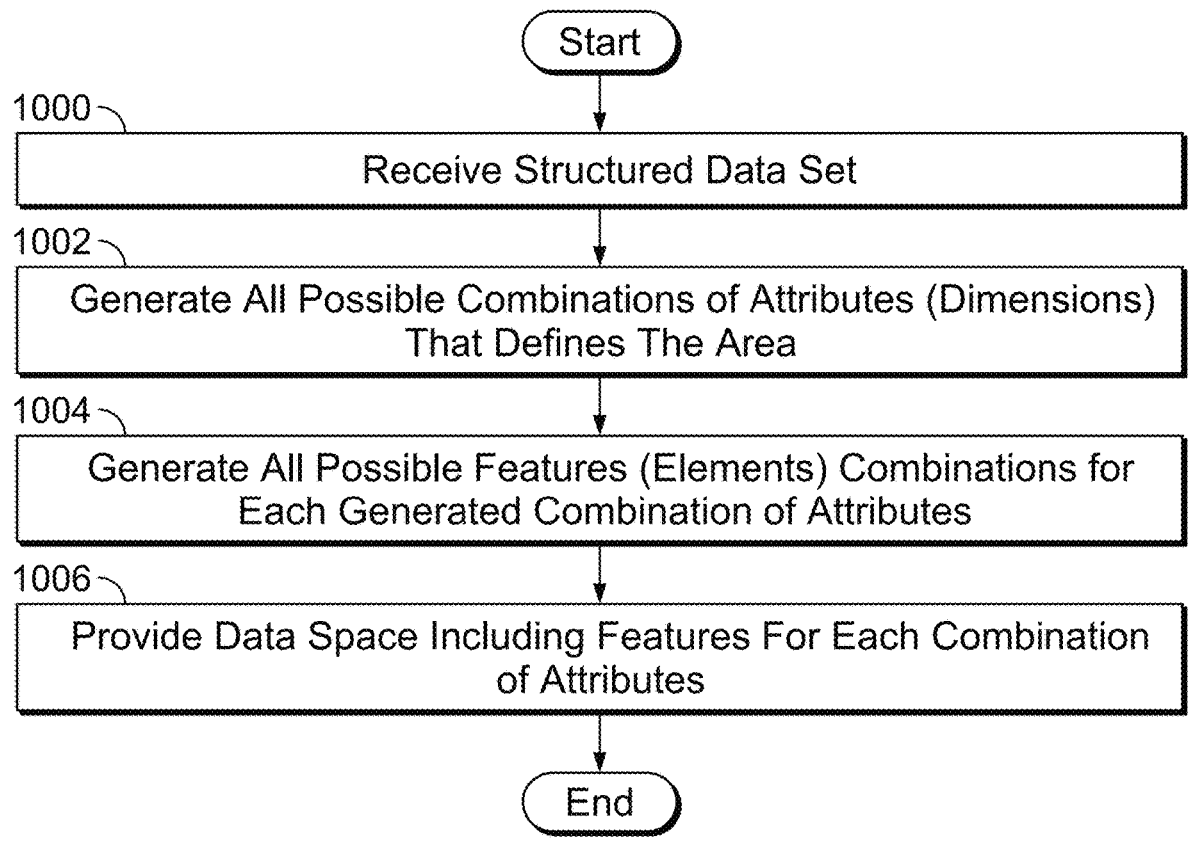
FIG. 10 is a flow diagram illustrating an embodiment of a process for determining a data space from the received structured data set.

FIG. 10 is a flow diagram illustrating an embodiment of a process for determining a data space from the received structured data set. In some embodiments, the process of FIG. 10 is used to implement 902 of FIG. 9. In the example shown, in 1000 a structured data set is received. In 1002, all possible combinations of attributes (dimensions) are generated that defines the area. In 1004, all possible features (elements) are generated for each generated combination of attributes. In 1006, a data space is provided that includes features for each combination of attributes, and the process ends.

Figure 11:
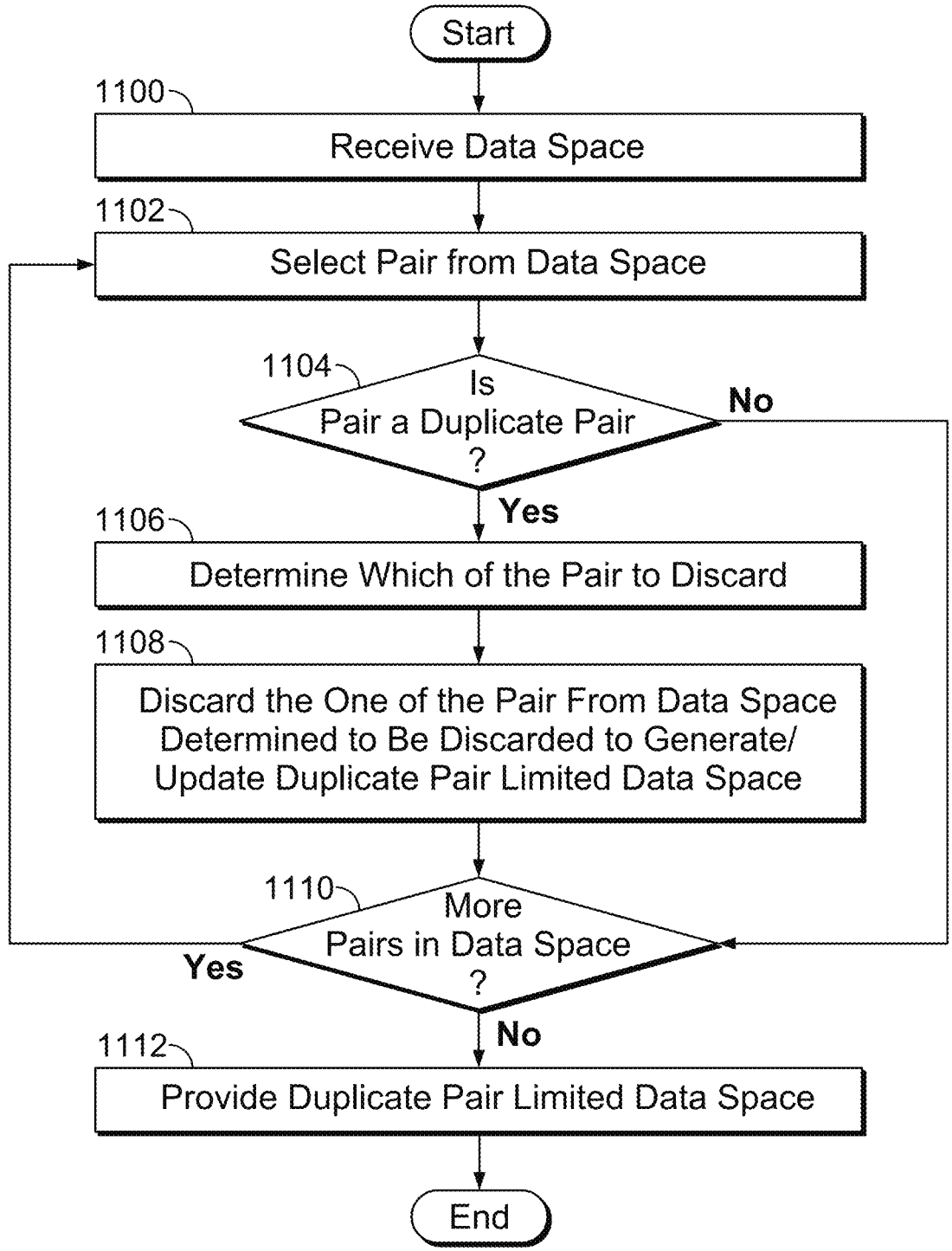
FIG. 11 is a flow diagram illustrating an embodiment of a process for removing duplicate pairs.

FIG. 11 is a flow diagram illustrating an embodiment of a process for removing duplicate pairs. In some embodiments, the process of FIG. 11 is used to implement 904 of FIG. 9. In the example shown, in 1100 a data space is received. In 1102, a pair is selected from the data space. In 1104, it is determined whether the pair is a duplicate. For example, determining whether the pair is a duplicate comprises evaluating (Dimension A (aggregation), Dimension B) and (Dimension B (aggregation), Dimension A) to see if the combination results are duplicates. In one case, the sum(revenue) grouped by products for every city is compared to the sum(revenue) grouped by cities for every product to see if the results match. In another case, a market share of products in every given city is compared to a market share of cities for every given product. In this case, the results do not match so that neither of the pair combinations can be discarded (the pair is asymmetric). In the event that the results match, then the pair is a duplicate.

In response to the pair not being a duplicate, control passes to 1110. In response to the pair being a duplicate, in 1106 it is determined which of the pair to discard. For example, determining which one of the pair should be discarded comprises determining which pair will optimize the computation of the results as a grouping and a looping operation for the pair probably took different amounts of time to determine—for example, usually grouping is more efficient for calculations. In some embodiments, determining which one of the pair includes comparing the computation time for each of the pair. In some embodiments, determining which one of the pair includes determining which of the pair groups attributes with larger cardinality (e.g., higher number of distinct features [elements]) than the other pair. In 1008, the one of the pair from the data space determined to be discarded is discarded to generate/update a duplicate pair limited data space. In 1110, it is determined whether there are more pairs in data space. For example, whether there are more pairs to process that have not yet been processed. In response to there being more pairs in data space, control passes to 1102. In response to there being no more pairs in data space, in 1112 the duplicate pair limited data space is provided, and the process ends.

Figure 12:
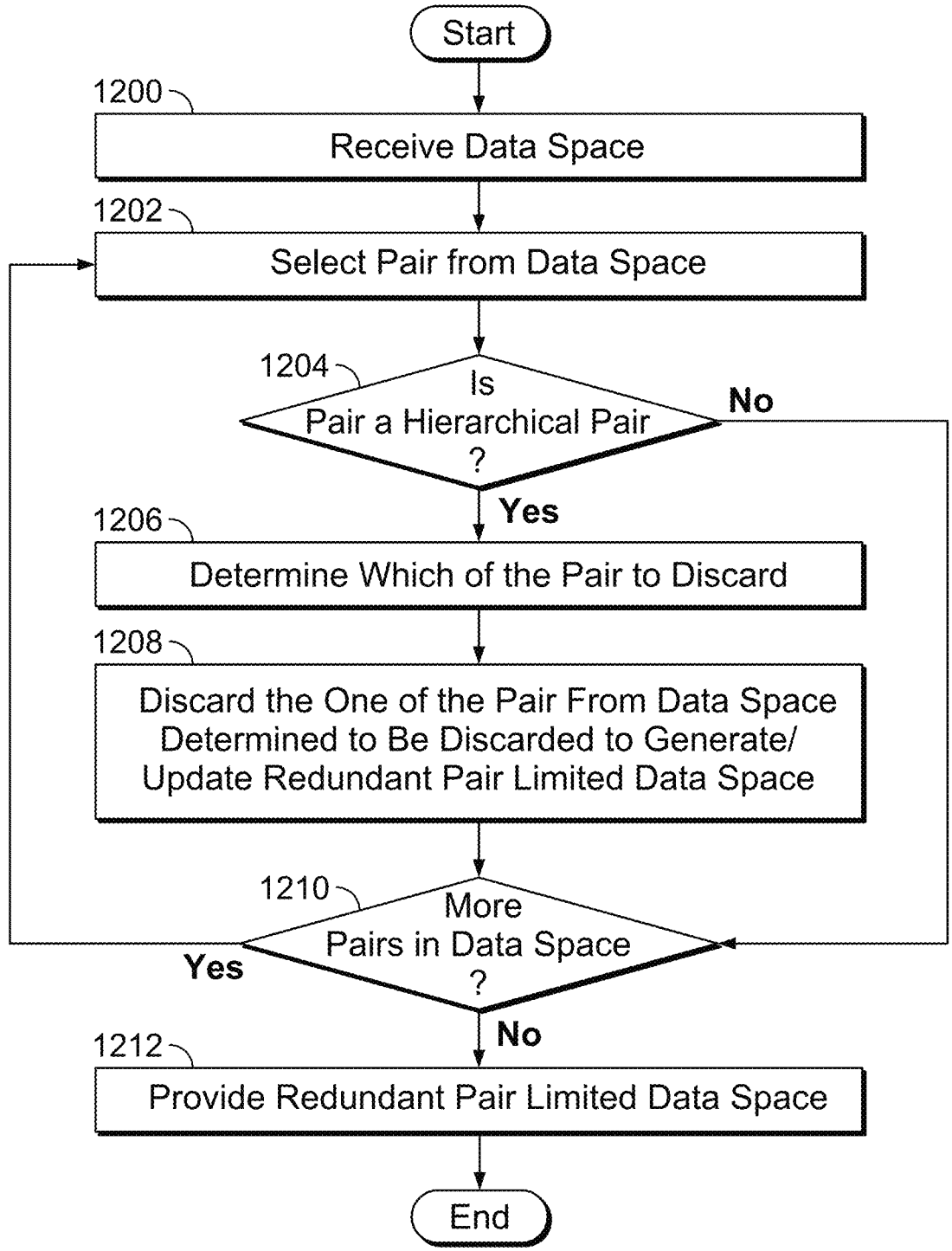
FIG. 12 is a flow diagram illustrating an embodiment of a process for removing duplicate pairs.

FIG. 12 is a flow diagram illustrating an embodiment of a process for removing duplicate pairs. In some embodiments, the process of FIG. 12 is used to implement 906 of FIG. 9. In the example shown, in 1200 a data space is received. In 1202, a pair is selected from the data space. In 1204, it is determined whether the pair is a hierarchical. For example, determining whether the pair is a hierarchical comprises evaluating (Dimension A (aggregation)) and (Dimension A (aggregation), Dimension B) to see if the combination results are duplicates. In one case, the sum(revenue) grouped by cities is compared to the sum(revenue) grouped by cities, for every country to see if the results match. The value produced by aggregating by Cities is identical to the value obtained by aggregating by Cities and their respective Countries. So, the automated analysis system can discard the combination the sum(revenue) grouped by cities, for every country. In another case, a market share of cities is compared to a market share of cities in their respective countries. In this case, the results do not match because, for example, the share of a New York market among other American cities is different from the share of the New York market among all cities globally, so that neither of the pair combinations can be discarded (the pair is not hierarchical). In the event that the results match, then the pair is hierarchical.

In response to the pair not being a hierarchical, control passes to 1210. In response to the pair being a duplicate, in 1206 it is determined which of the pair to discard. For example, determining which one of the pair should be discarded comprises determining which pair will optimize the computation of the results as a grouping and a looping operation for the pair probably took different amounts of time to determine—for example, usually grouping is more efficient for calculations. In some embodiments, determining which one of the pair includes comparing the computation time for each of the pair. In some embodiments, determining which one of the pair includes determining which of the pair groups attributes with larger cardinality (e.g., higher number of distinct features [elements]) than the other pair. In 1208, the one of the pair from the data space determined to be discarded is discarded to generate/update a redundant pair limited data space. In 1210, it is determined whether there are more pairs in the data space. For example, whether there are more pairs to process that have not yet been processed. In response to there being more pairs in data space, control passes to 1202. In response to there being no more pairs in data space, in 1212 the redundant pair limited data space is provided, and the process ends.

Every input structured data for combinatorial analysis by the system can be subjectively described by a set of properties that specify value of the analysis for some attributes or their combinations by the user. This description doesn't change over time. One structured dataset can have a different Business Model description compared to another (e.g., different companies or different departments in the company might have different descriptions). Some of the attributes allow the automated analysis system to remove some combinations from the data space to improve the relevance of results provided to the user. One such attributes, the explanation-only attribute, describes whether or not the attribute of the dimension should be used by the automated analysis system as an explanatory factor. Another such attributes, the forbidden aggregation dimension, signifies whether an aggregation is allowed over the dimension. Both of these attributes, potentially limit the scope of the data space.

Figure 13:
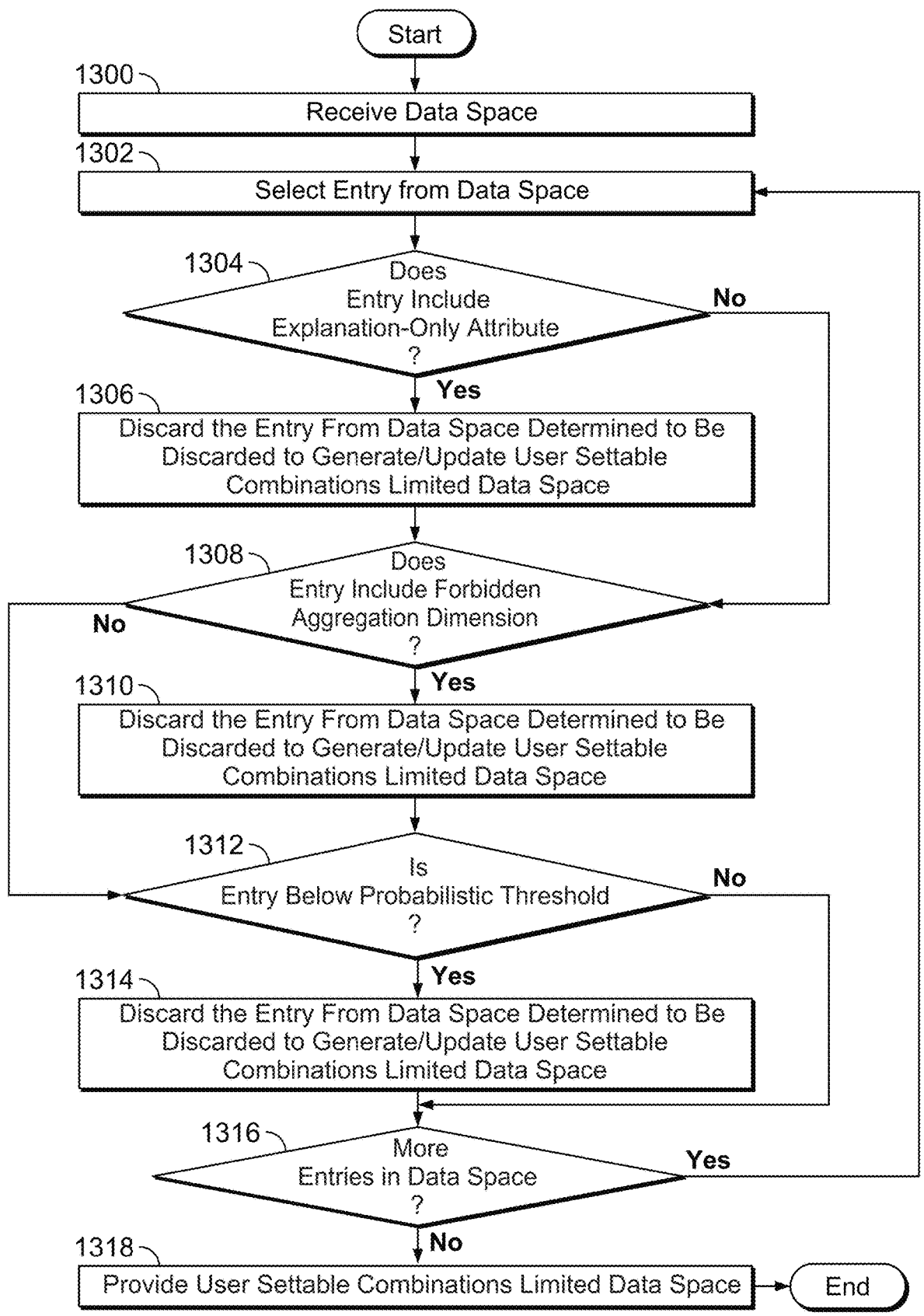
FIG. 13 is a flow diagram illustrating an embodiment of a process for removing settable combinations.

FIG. 13 is a flow diagram illustrating an embodiment of a process for removing settable combinations. In some embodiments, the process of FIG. 13 is used to implement 908 of FIG. 9. In the example shown, in 1300 a data space is received. In 1302, an entry from data space is selected. In 1304, it is determined whether the entry includes an explanation-only attribute. In response to the entry including the explanation-only attribute, in 1306 the entry from the data set determined to be discarded is discarded to generate/update a user settable combinations limited data space, and control passes to 1308. In response to the entry not including the explanation-only attribute, control passes to 1308.

In some embodiments, a user denotes some attributes (dimensions) as explanation-only. In some embodiments, a user defines which dimensions can be explained by any given dimension. For example, a user might not want to be notified about observable situations specific to a particular dimension (e.g., a shop size dimension), because there is no actionable information. However, even though not actionable, the situations may be useful to provide an explanation or to provide context for some other results. As a first example, a (shop size (aggregation)) area will not be part of a data space. However, a (shop size (aggregation), country) area will be part of the data space, but only if it is surfaced as an explanatory factor for the results covering countries. As a second example, a first dimension (e.g., a city attribute (dimension)) might be too granular to provide context to a user, nevertheless it could provide some value when paired with another dimension (e.g., a country dimension). The system enables specifying that results for the first dimension (e.g., countries) will be surfaced to users, but the finding about second dimension (e.g., city) will only be provided in the context of the first dimension (e.g., country) as an explaining factor. In other words, (city (aggregation)) will not be part of the data space, (country (aggregation)) will be part of the data space, and (city (aggregation), country) will be part of the data space but only to surface explaining factors for the results covering countries.

In some embodiments, a user might forbid some dimensions to be able to form some areas (nodes). As the dimensions will be in some nodes, but not all possible nodes. This will have an impact in case of an asymmetric measure—for example, when analyzing market share. As an example of forbidding aggregation, in the case when the automated analysis system is analyzing a structured dataset with a product dimension and a country dimension and the users are not interested in market share of countries. If the user marks a country with a forbidden aggregation attribute, then the entry is not allowed in the analysis of the combinations. In one example, (product (aggregation), country) will be part of the data space and (country (aggregation), product) will not be part of the data space.

In 1308, it is determined whether the entry includes a forbidden aggregation dimension. In response to the entry including the forbidden aggregation dimension, in 1310 the entry from the data set determined to be discarded is discarded to generate/update a user settable combinations limited data space, and control passes to 1312. In response to the entry not including the forbidden aggregation dimension, control passes to 1312.

In 1312, it is determined whether the entry is below a probabilistic threshold. In response to the entry being below a probabilistic threshold, in 1314 the entry from the data set determined to be discarded is discarded to generate/update a user settable combinations limited data space, and control passes to 1314. In response to the entry not being below a probabilistic threshold, control passes to 1316.

Not all combinations of attributes will have the same probability of containing a result that will be identified as an important observable situation for the user. The results represented as changes in some values in time or anomalous distributions contained in part or in the whole combination will not be impactful enough. Automated analysis program cannot know for sure before running the analysis, but it can estimate the probability and then prioritize the traversal of the data space according this probability. The ordering that will be received can be used to limit the data space and hence computation (both in time and in memory usage) to some predefined number of analyses while minimizing the probability this reduced data space will miss impactful observable situations. This ordering will change over time for every structured dataset as it gets updated because the ordering depends on the values in the dataset. A set of calculations can be selected as those of the ordered list that are above a threshold. Alternatively, the first N entries of the ordered can be selected for processing.

The choice of probability metric used to sort the combinations depends on the definition of what is the most impactful change in the structured data. It can be a localized change that influenced the most the top level key performance indicator (KPI)—for example, a drop in the sales of green widgets in Canada should be surfaced to the user as the main result if it's the single biggest driver for the drop in global revenue of the company. Other options for the metric used to sort combinations could be a statistical significance metric, a most actionable metric, or a combination of the two metrics. The probability metric to prioritize combinations can be defined by a mathematical formula that is correlated with the probability of a significant change in the structured data being present or the probability metric can be estimated by a probabilistic model that is trained on prior data set. In some embodiments, an iceberg cube is determined for a structured data set comprising multidimensional OLAP cubes, where the iceberg cube comprises the cells in the structured data that meet a minimum condition (e.g., probability metric above a threshold).

In some embodiments, a model (e.g., a statistical model, a machine learning model, or any other appropriate model) is used to generate the probability metric, where the model determines the metric by estimating the most impactful change using headcount as one of the inputs having been trained on past data sets.

In 1316, it is determined whether there are more entries in the data space. For example, whether there are more entries to process that have not yet been processed. In response to there being more entries in the data space, control passes to 1302. In response there not being more entries in the data space, in 1318 the settable combinations limited data space is provided, and the process ends.

FIG. 14 is a diagram illustrating an embodiment of a data set. In the example shown, the data set includes three columns country, organization, and headcount. Row 1 has country: 'USA', organization: 'Product', and headcount: '900'. Row 2 has country: 'USA', organization: 'Sales', and headcount: '100'. Row 3 has country: 'Canada', organization: 'Product', and headcount: '300'. Row 4 has country: 'Canada', organization: 'Sales', and headcount: '50'. In an example case, the scoring of the changes is done so the change that influences the top level KPI the most is surfaced first. If the structured data contains a value (measure) which can be interpreted as a population of the analyzed samples, this population can serve as good proxy to sort areas (nodes) and their parts according to the chance the most impactful change will be contained there. For example, in the case where the analyzed measure is the attrition rate of employees, the prioritized measure that can serve as a proxy is the active employee headcount. In this case, the combinations (Country (aggregation)) and (Country (aggregation), organization) can be examined and the order of the areas (nodes) in the data space and subsequent automated analysis would be:

Attrition rate for Org: Product
   from combination (Organization (aggregation))
   headcount: 1,200
Attrition rate for Country: US
   from combination (Country)
   headcount: 1,000
Attrition rate for (Org: Product, Country: US)
   from combination (Organization (aggregation), Country)
   headcount: 900
Attrition rate for Country: Canada
   from combination (Country (aggregation))
   headcount: 350
Attrition rate for (Org: Product, Country: Canada)
   from combination (Organization (aggregation), Country)
   headcount: 300
Attrition rate for Org: Sales
   from combination (Organization (aggregation))
   headcount: 150
Attrition rate for (Org: Sales, Country: US)
   from combination (Organization (aggregation), Country)
   headcount: 100
Attrition rate for (Org: Sales, Country: Canada)
   from combination (Organization (aggregation), Country)
   headcount: 50

Figure 15:
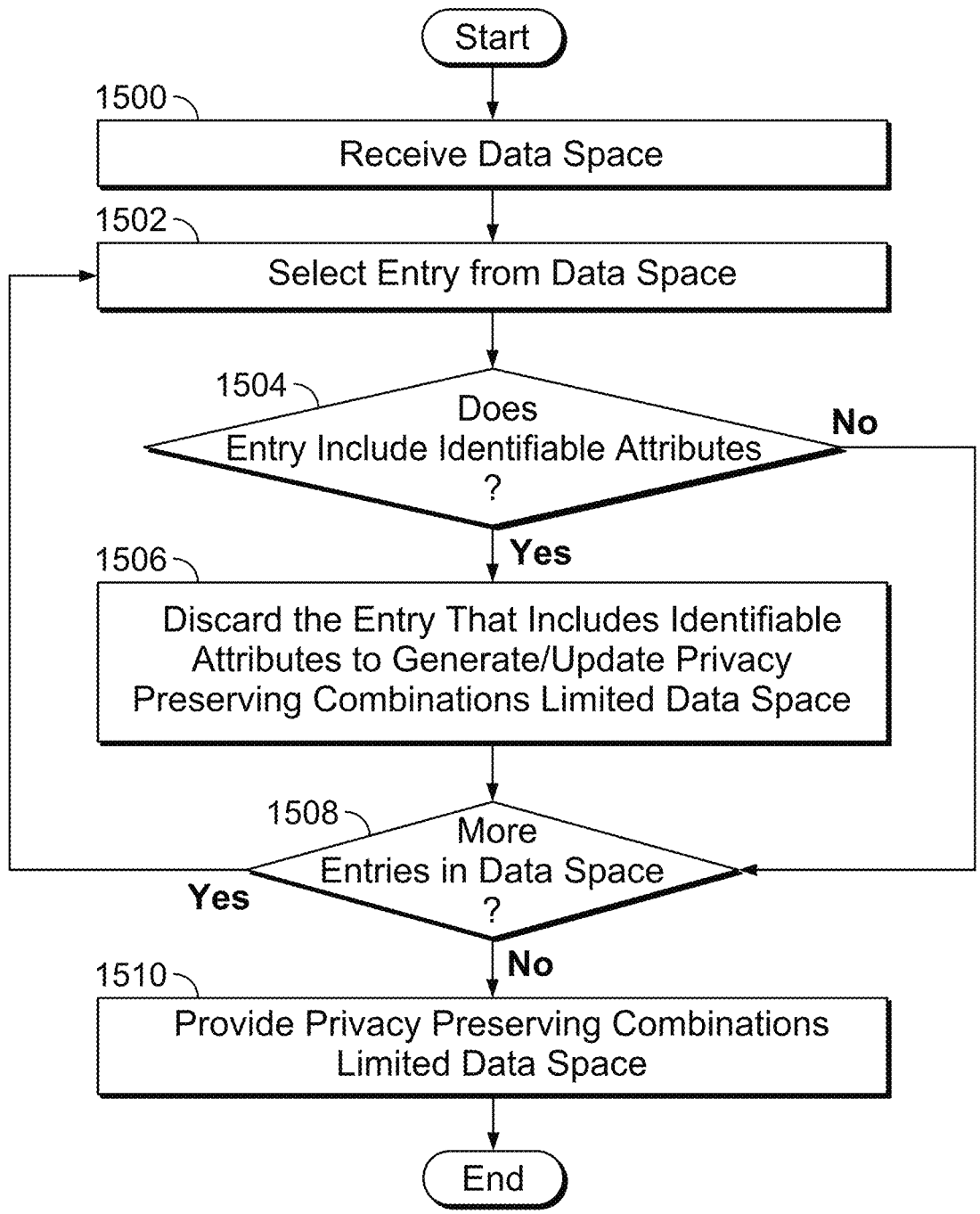
FIG. 15 is a flow diagram illustrating an embodiment of a process for privacy preservation.

FIG. 15 is a flow diagram illustrating an embodiment of a process for privacy preservation. In some embodiments, the process of FIG. 15 is used to implement 910 of FIG. 9. In the example shown, in 1500 a data space is received. In 1502, an entry is selected from the data space. In 1504, it is determined whether the entry includes identifiable attributes. For example, determining whether the entry includes identifiable attributes comprises determining combinations containing identifiable attributes (dimensions) (e.g. employee ID) or combinations of dimensions that taken together might identify some records (e.g. organization taken together with seniority and year of birth). In response to the entry not including identifiable attributes, control passes to 1508. In response to the entry including identifiable attributes, in 1506 the entry that includes identifiable attributes is discarded to generate/update a privacy preserving combinations limited data space, and control passes to 1508. In 1508, it is determined whether there are more entries in the data space. For example, are there entries that have not yet been processed from the data space. In response to there being more entries in the data space, control passes to 1502. In response to there being no more entries in the data space, in 1510 the privacy preserving combinations limited data space is provided, and the process ends.

In some embodiments, privacy is also preserved by adding noise to the dataset according to the rules of differential privacy.

Figure 16:
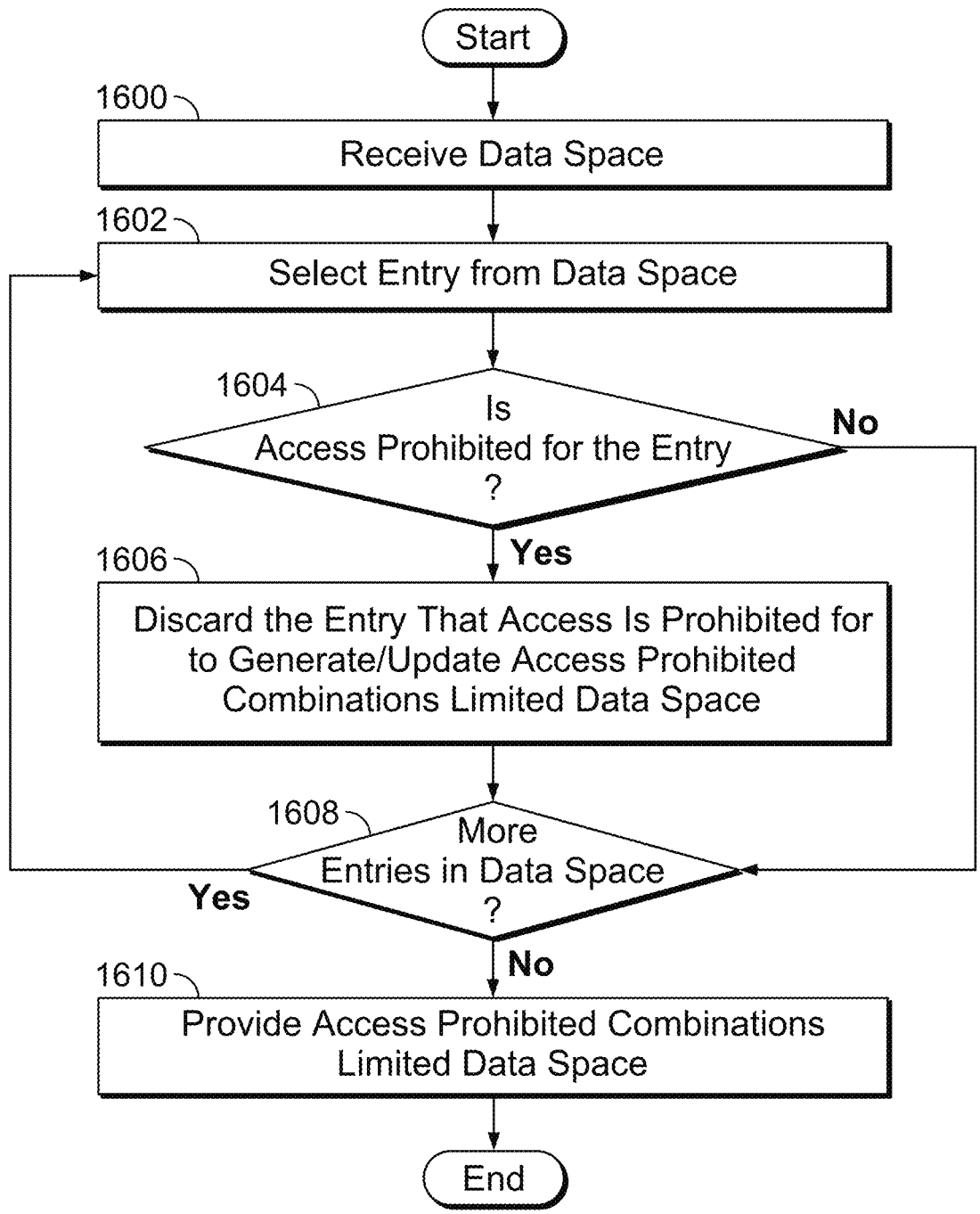
FIG. 16 is a flow diagram illustrating an embodiment of a process for privacy preservation.

FIG. 16 is a flow diagram illustrating an embodiment of a process for privacy preservation. In some embodiments, the process of FIG. 16 is used to implement 912 of FIG. 9. In the example shown, in 1600 a data space is received. In 1602, an entry is selected from the data space. In 1604, it is determined whether access is prohibited for the entry. For example, determining whether access is prohibited for the entry includes determining whether the user has access to the combination of attributes of the entry. In response to access not being prohibited for the entry, control passes to 1608. In response to access being prohibited for the entry, in 1606 the entry for which access is prohibited is discarded to generate/update an access prohibited combinations limited data space, and control passes to 1608. In some embodiments, the entry is removed in the event that no registered user will have access to the entry. In some embodiments, the entry is hidden from a user who should not have access, but is not hidden from a user who has access. In some embodiments, for the purpose of limiting analysis entries are removed that are not accessible to anyone. In some embodiments, for the purpose of relevant insight selection, the "privacy" check is run separately for every user. In 1608, it is determined whether there are more entries in the data space. For example, are there entries that have not yet been processed from the data space. In response to there being more entries in the data space, control passes to 1602. In response to there being no more entries in the data space, in 1610 the access prohibited combinations limited data space is provided, and the process ends.

In some embodiments, users might have access only to part of the structured data and as such should have access only to some of the results of the automated analysis system. Additionally, some results might be hidden from the user based a user's previous interactions and the fact the user's scope is different from other user's scope. The system can learn from user interaction and user feedback, some attributes (dimensions) (e.g. "Shop Size") or elements (e.g. the "US") or combinations of those (e.g. Coffee in the US) that are consistently not useful or extremely useful to the users.

Furthermore what is important to one user (in global context, sales in the US are down) might be obvious to another one (regional manager for US).

In some embodiments, the familiarity with the operational state a company is different among users. Through user interaction and feedback the automated analysis system can estimate a threshold beyond which the user is not interested. For example, the user is familiar with the state of the analyzed domain so that a given insight is common knowledge to that user. Specifically, in the case where the US represents 92% of sold items and for a situation where a drop in sales occurred for the entire US, a domain expert familiar with the data would know about this situation without any automated analysis of the structured data. On the other hand, the drop in sales for Coffee in New York or for Tea in Prague might cause a similar loss for the company but be much less visible to the users. In various embodiments, the threshold comprises one number, function that progressively decreases the ranking of the insight based on how "obvious" the analyzed element is to a user, a combination of elements, or any other appropriate threshold. Such user feedback may be used to inform the selection of stories specifically for the user who provided that feedback, or for other users as well (e.g., using machine learning or otherwise). In some embodiments, user feedback may also be used to identify dimensions or elements that should be hidden, as they are frequently marked as not interesting or not useful.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for data space limitation, comprising:
   an interface configured to:
      receive a query for a structured data set, wherein the structured data set includes one or more entries; and
   a processor configured to:
      determine combinations of the one or more entries based at least in part on attributes associated with the one or more entries;
      order the combinations based on a probability metric for each combination of the combinations to obtain an ordered list of combinations, wherein the probability metric is an estimate that a combination of the combinations will be identified as a significant observable situation for a user, and wherein the probability metric is determined using a probability model that is trained on a prior data set;
      limit, based on the ordered, list of combinations, a data space for calculations to respond to the query;
      perform the calculations according to the limited data space; and
      provide results of the calculations.

2. A system of claim 1, wherein the structured data set enables limiting the data space for calculation.

3. A system of claim 2, wherein symmetry of the structured data set produces duplicate results where one operation that produces one of the duplicate results is removed from the data space for calculation.

4. The system of claim 3, wherein removal of the duplicate results comprises determining a first element combination of attributes and a second element combination of attributes, and in response to the first element combination of attributes and the second element combination of attributes being duplicates, select a first element or a second element for removal from the data space for calculation.

5. A system of claim 2, wherein hierarchy of the structured data set leads to redundant calculations where one operation that produces a redundant calculation of the redundant calculations is removed from the data space for calculation.

6. The system of claim 5, wherein removal of the redundant calculations comprises determining a first element combination of attributes and a second element combination of attribute, and in response to the first element combination of attributes and the second element combination of attributes being duplicates, select a first element or a second element for removal from the whole data set.

7. A system of claim 2, wherein a settable criterion enables limiting the data space for calculation.

8. The system of claim 7, wherein removal of a user settable combination indicated by the settable criterion comprises determining explanation-only combinations and selecting the explanation-only combinations for removal.

9. The system of claim 7, wherein removal of a user settable combinations indicated by the settable criterion comprises determining forbidden aggregation combinations and selecting the forbidden aggregation combinations for removal.

10. A system of claim 2, wherein a privacy criterion enables limiting the data space for calculation.

11. The system of claim 10, wherein removal of a privacy preserving combination indicated by the privacy criterion comprises determining identifiable attributes combinations and selecting the identifiable attributes combinations for removal.

12. A system of claim 2, wherein an access prohibition criterion enables limiting the data space for calculation.

13. The system of claim 1, wherein removal of an access prohibited combination indicated by the access prohibition criterion comprises determining access prohibited combinations for a user and selecting the access prohibited combinations for removal.

14. The system of claim 13, wherein the processor is further configured to:
   determine a set of time prioritizations for calculating each combination of an access prohibited combination limited data space based on a ranking of estimated execution time for determining a given combination calculation;
   calculate combinations within the access prohibited combination limited data space according to the set of time prioritizations; and
   provide a result for combinations calculated up to a result time limit to a user requesting the result after the result time limit has passed.

15. The system of claim 13, wherein the processor is further configured to:
   determine a set of memory space prioritizations for calculating each combination of an access prohibited combination limited data space based on a ranking of estimated memory space usage for determining a given combination calculation;
   calculate combinations within the access prohibited combination limited data space according to the set of memory space prioritizations; and
   provide a result for combinations calculated up to a result time limit to a user requesting the result after the result time limit has passed.

16. The system of claim 1, wherein the processor is further configured to:

determine a localized change that most influenced a performance indicator;

determine a value that is a population on which the localized change depends; and determine a set of prioritization values for calculating each combination based at least in part on the value.

17. The system of claim 16, wherein the localized change is determined using a probabilistic model.

18. The system of claim 17, wherein the probabilistic model is trained using prior determinations of localized changes that most influenced the performance indicator.

19. The system of claim 16, wherein the processor is further configured to:

calculate combinations within the access prohibited combination limited data space according to the set of prioritization values; and provide a result for combinations calculated up to a result time limit to a user requesting the result after the result time limit has passed.

20. The system of claim 1, wherein limiting the list of combinations comprises determining whether the probability metric for the combination is below a probabilistic threshold.

21. A method for data space limitation, comprising:

receiving a query for a structured data set, wherein the structured data set includes one or more entries;

determining, using a processor, combinations of the one or more entries based at least in part on attributes associated with the one or more entries;

ordering the combinations based on a probability metric for each combination of the combinations to obtain an ordered list of combinations, wherein the probability metric is an estimate that a combination of the combinations will be identified as a significant observable situation for a user, and wherein the probability metric is determined using a probability model that is trained on a prior data set;

limiting, based on the ordered list of combinations, a data space for calculations to respond to the query;

performing the calculations according to the limited data space; and providing results of the calculations.

22. A computer program product for data space limitation, the computer program product being embodied in a non-transitory computer readable storage medium and comprising computer instructions for:

receiving a query for a structured data set, wherein the structured data set includes one or more entries;

determining, using a processor, combinations of the one or more entries based at least in part on attributes associated with the one or more entries;

ordering the combinations based on a probability metric for each combination of the combinations to obtain an ordered list of combinations, wherein the probability metric is an estimate that a combination of the combinations will be identified as a significant observable situation for a user, and wherein the probability metric is determined using a probability model that is trained on a prior data set;

limiting, based on the ordered list of combinations, a data space for calculations to respond to the query;

performing the calculations according to the limited data space; and providing results of the calculations.

* * * * *